UNITED STATES PATENT OFFICE.

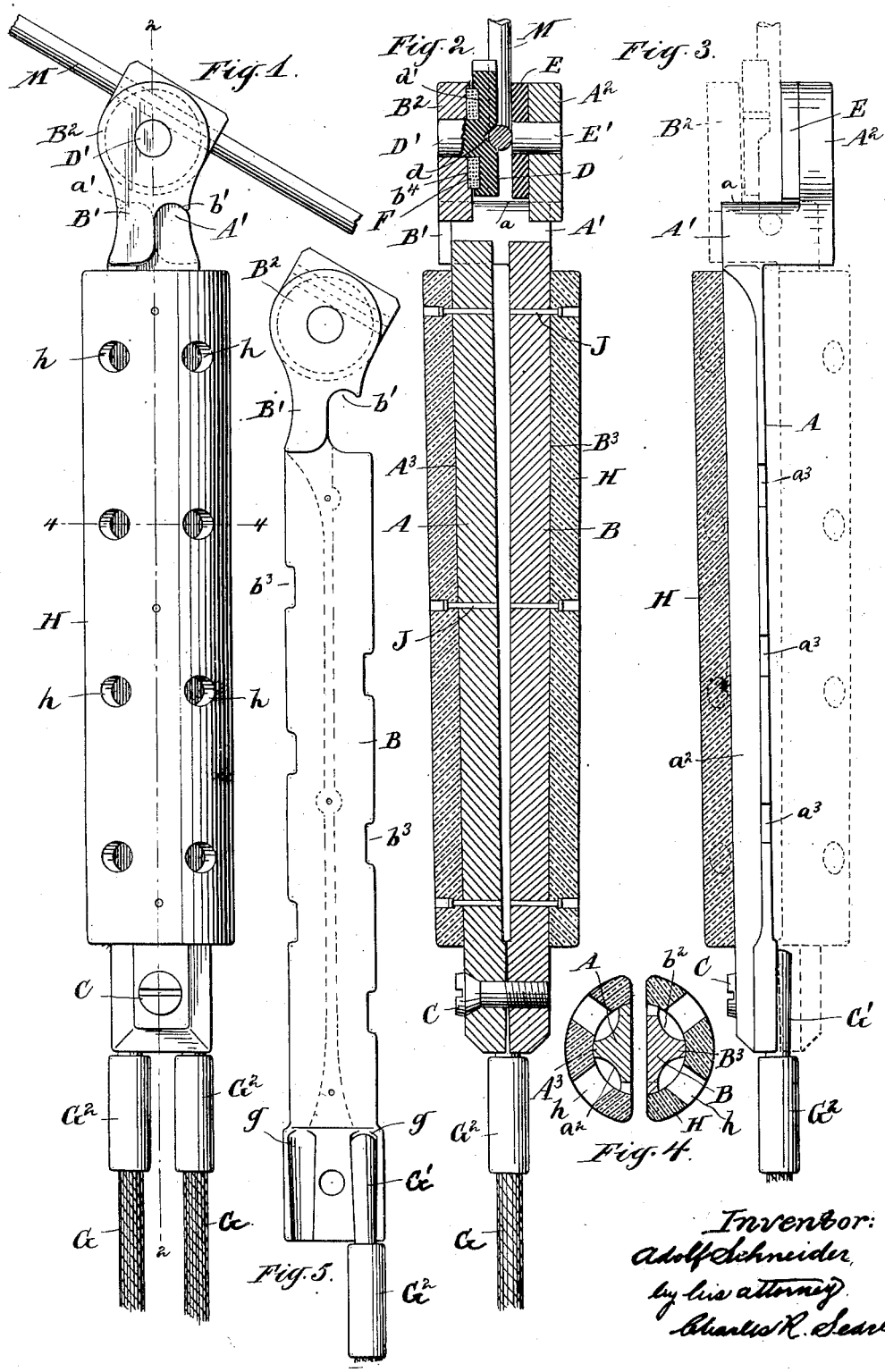

ADOLF SCHNEIDER, OF BROOKLYN, NEW YORK.

WIRE-HOLDER FOR ELECTRIC WELDING.

1,316,334.  Specification of Letters Patent.  Patented Sept. 16, 1919.

Application filed May 28, 1919. Serial No. 300,339.

*To all whom it may concern:*

Be it known that I, ADOLF SCHNEIDER, a citizen of the United States, residing in the city of New York, borough of Brooklyn, in the county of Kings and State of New York, have invented a certain new and useful Improvement in Wire-Holders for Electric Welding, of which the following is a specification.

The invention relates to devices for holding and presenting the wire to be fused in electric welding operations, and the object of the invention is to provide a tool in which the wire is reliably held without springs, until intentionally released, and in which the angular direction of the wire relatively to the tool may be varied while thus clamped.

Another object is to provide means for holding the cables securely and insuring the desired transmission of current to and through the wire.

A further object is to provide for cooling the tool and avoiding the danger of contact between the hand of the operator and the electrode bars or conductors.

The invention consists in certain novel features and details of construction and arrangement by which the above objects are attained, to be hereinafter described and claimed.

The accompanying drawings form a part of this specification and show an approved form of the invention.

Figure 1 is a side elevation of the tool with a wire held therein.

Fig. 2 is a longitudinal section taken on the line 2—2 in Fig. 1, and partly in elevation.

Fig. 3 is an elevation showing one of the electrode bars, seen at a right angle to Fig. 1, with the insulating shell therefor shown in longitudinal section. The companion electrode bar and its shell is shown in dotted lines.

Fig. 4 is a transverse section of the tool, taken on the line 4—4 in Fig. 1.

Fig. 5 is an elevation of one of the electrode bars alone, showing its plane inner face.

Similar letters of reference indicate the same parts in all the figures.

A and B are bars of bronze forming the electrode, joined at the lower ends by a single screw C, having their inner adjacent faces plane throughout the main portions of their length and held yieldingly slightly separated along such faces by the screw C.

The bar A has a laterally extended head $A^1$ rounded on its upper face as at $a$, carrying at its outer end an upwardly extended flange or lug $A^2$ offset from the bar, and the bar B has a similar but oppositely arranged head $B^1$ similarly rounded as at $b$ and provided with a correspondingly offset lug $B^2$.

The lugs $A^2$ $B^2$ are notched oppositely on their under sides as at $a^1$ $b^1$ to receive the rounded upper faces of the heads $A^1$ $B^1$ and thus interlock the upper ends of the bars and hold them in slidable engagement permitting the adjacent faces of the lugs $A^2$ $B^2$ to move toward and from each other, and as the lug of the bar A, shown at the left in Fig. 2, is offset to the right, and the lug of the bar B oppositely placed, the spring or set of the bars due to the action of the screw C tends to draw the lugs toward each other by the separation of the bars, and clamp any object between the lugs. By compression on the bars in the direction to force their plane faces together, the lugs are forced apart and will release such object.

The lug $B^2$ is bored to receive a pintle $D^1$ on a disk D having a transverse angular groove $d$ across its inner face, and the lug $A^2$ is bored to receive a rivet $E^1$ extending through a plate or distance-piece E. These parts are also of bronze to insure the desired conductivity.

The wire end to be fused is laid in the groove $d$ by compressing the bars together, and is held frictionally between the disk D and distance-piece E by the set of the bars when the latter are released, in contact with such disk and distance-piece across the entire face of each, thus insuring the required transmission of current, and the wire may be directed at any desired angle relatively to the bars by turning it, with the disk D, on the lug $B^2$ with the pintle $D^1$ as a center.

To impart a further degree of resiliency without lessening the area of contact in thus turning the disk D, the inner face of the lug $B^2$ and adjacent face of the disk D are recessed concentrically to the pintle $D^1$, as at $b^4$ and $d^1$, to receive an annular gasket or cushion F of braided or interlaced copper or bronze wire serving to separate slightly the faces of the lug and disk and insure complete contact through the cushion over a large area between such lug and disk in all positions of the latter.

At the lower end of each bar A and B are tapered grooves or sockets as at $g$ receiving the oppositely tapered soldered ends $G^1$ of the cables G, both of which supply current to the bars. The upper ends of the sockets are larger than the lower and the ends $G^1$ are correspondingly shaped and lie half in each bar securely clamped in place by the screw C.

The back or outer face of each bar A and B is grooved or coved longitudinally as at $a^2\ b^2$, see Fig. 4, leaving a central rib $A^3\ B^3$, and each bar is inclosed in a semicylindrical shell H of thick insulating material of any suitable composition extending from a short distance above the screw C nearly to the heads $A^1\ B^1$ and adapted to be grasped both together in the hand of the operator.

The ends of the cables adjacent the lower ends of the bars are covered with insulation as at $G^2$ extending as far down as may be required to avoid accidental contact.

The semicylindrical shells H are secured to the bars by slender rivets J having their heads set well below the exterior surface of the shells, and the latter are provided each with two series of perforations $h$ extending from the exterior to the interior spaces formed by the longitudinal coves $a^2\ b^2$, to permit a circulation of air about the bars, the latter are also notched along the margins as at $a^3\ b^3$ to facilitate such circulation and lessen the danger of overheating.

The two cables and bars form a single electrode through which the current passes to the wire M fusing the latter as usual in the welding operation.

The distance-piece E may be removed by forcing out the rivet $E^1$, which is designed to be thus driven when required, and replaced by a distance-piece of greater or less thickness adapted to serve with a wire of corresponding diameter, or the distance-piece may be omitted in conditioning the tool for service with a very large wire. The tool as shown is designed to serve with currents of about 150 amperes.

The tool holds the wire reliably while permitting it to be presented at any desired angle, the cables are positively engaged, the danger of contact of the hand with the electrode bars is reduced to a minimum, and the provisions for the circulation of air around the electrode bars lessens the danger of overheating.

It will be noted that no spring is required, the screw C serving to hold the bars yieldingly separated with the required degree of resilience and at the same time clamping the cables G positively to the bars.

I claim:—

1. Two electrode bars, each having a lug at one end offset out of the plane of the bar, adapted to grasp a wire between said lugs, and means for joining said bars together at their other ends.

2. Two electrode bars, each having a lug at one end offset out of the plane of the bar, adapted to grasp a wire between said lugs, means at the other ends of said bars for joining the latter together and holding said bars yieldingly separated, and an insulating shell on each of said bars.

3. Two electrode bars, each having a lug at one end offset out of the plane of the bar, adapted to grasp a wire between said lugs, a screw joining said bars together at their other ends and holding said bars yieldingly separated, and an insulating shell on each of said bars.

4. Two electrode bars, each having a head and a lug thereon at one end offset out of the plane of the bar, adapted to grasp a wire between said lugs, each of said lugs having a notch adapted to receive the head of the opposite bar and slidably interlock said bars, and means at the other ends of said bars for joining the latter and holding them yieldingly separated.

5. Two electrode bars, each having an offset lug at one end, adapted to grasp a wire between said lugs, means at the other ends of said bars for joining the latter and holding them yieldingly separated, and a disk rotatably mounted on one of said lugs and having a groove across its face, adapted to receive such wire.

6. Two electrode bars, each having an offset lug at one end, adapted to grasp a wire between said lugs, means at the other ends of said bars for joining the latter and holding them yieldingly separated, a disk rotatably mounted on one of said lugs and having a groove across its face, and a cushion of conducting material between said disk and lug.

7. Two electrode bars, each having an offset lug at one end, adapted to grasp a wire between said lugs, means at the other ends of said bars for joining the latter and holding them yieldingly separated, a disk rotatably mounted on one of said lugs and having a groove across its face, annular recesses in the adjacent faces of said disk and its lug, and an annular cushion of conducting material in said recesses.

8. Two electrode bars, each having an offset lug at one end adapted to grasp a wire between said lugs, means at the other ends of said bars for joining the latter and holding them yieldingly separated, and a removable distance-piece on one of said lugs.

9. Two electrode bars, each having an offset lug at one end adapted to grasp a wire between said lugs, means at the other ends of said bars for joining the latter and holding them yieldingly separated, a disk rotatably mounted on one of said lugs and having a groove across its face adapted to receive such wire, and a distance-piece removably mounted on the other of said lugs.

10. Two electrode bars, each having an offset lug at one end adapted to grasp a wire between said lugs, sockets formed partly in each of the other ends of said bars, adapted to receive the ends of cables, a screw in such other ends serving the double function of joining said bars together at such other ends and holding said bars yieldingly separated, and clamping said cable ends in said sockets.

11. Two electrode bars, each having an offset lug at one end adapted to grasp a wire between said lugs, sockets formed partly in each of the other ends of said bars, adapted to receive the ends of cables and shaped to prevent the withdrawal of the latter, a screw in such other ends serving the double function of joining said bars together at such other ends and holding said bars yieldingly separated, and clamping said cable ends in said sockets.

12. An electrode bar having its rear face grooved along its margin, and a semicylindrical insulating shell inclosing such rear face and having perforations communicating from the exterior of said shell to said grooves.

13. An electrode bar having its rear face grooved along its margins and having notches in such margins, and a semicylindrical insulating shell inclosing such rear face and having perforations communicating from the exterior of said shell to said grooves and notches.

In testimony that I claim the invention above set forth I affix my signature.

ADOLF SCHNEIDER.